US011825218B2

(12) United States Patent
Berner et al.

(10) Patent No.: US 11,825,218 B2
(45) Date of Patent: Nov. 21, 2023

(54) DYNAMIC REGION OF INTEREST (ROI) FOR EVENT-BASED VISION SENSORS

(71) Applicant: Sony Advanced Visual Sensing AG, Schlieren (CH)

(72) Inventors: Raphael Berner, Confignon (CH); Marc Osswald, Zürich (CH); Massimo Zannoni, Zürich (CH)

(73) Assignee: Sony Advanced Visual Sensing AG, Schlieren (CH)

( * ) Notice: Subject to any disclaimer, the term of this patent is extended or adjusted under 35 U.S.C. 154(b) by 0 days.

(21) Appl. No.: 17/617,416

(22) PCT Filed: Jun. 30, 2020

(86) PCT No.: PCT/IB2020/056201
§ 371 (c)(1),
(2) Date: Dec. 8, 2021

(87) PCT Pub. No.: WO2021/001760
PCT Pub. Date: Jan. 7, 2021

(65) Prior Publication Data
US 2022/0264035 A1 Aug. 18, 2022

Related U.S. Application Data

(60) Provisional application No. 62/869,311, filed on Jul. 1, 2019.

(51) Int. Cl.
H04N 25/443 (2023.01)
H04N 25/50 (2023.01)

(52) U.S. Cl.
CPC .......... H04N 25/443 (2023.01); H04N 25/50 (2023.01)

(58) Field of Classification Search
CPC ...... H04N 5/3454; H04N 5/351; H04N 5/341; H04N 5/378; H04N 5/3694; H04N 25/443; H04N 25/50; H04N 25/40; H04N 25/75; H04N 25/7013
See application file for complete search history.

(56) References Cited

U.S. PATENT DOCUMENTS

| 7,728,269 | B2 | 6/2010 | Lichtsteiner et al. |
| 2008/0135731 | A1 | 6/2008 | Lichtsteiner et al. |
| 2010/0182468 | A1 | 7/2010 | Posch et al. |
| 2016/0210513 | A1 | 7/2016 | Wang et al. |
| 2017/0084044 | A1 | 3/2017 | Keh et al. |

(Continued)

FOREIGN PATENT DOCUMENTS

| WO | WO 2017149433 A1 | 9/2017 |
| WO | WO 2018122798 A1 | 7/2018 |

OTHER PUBLICATIONS

Ghosh, R., et al., "Real-Time Object Recognition and Orientation Estimation Using an Event-Based Camera and CNN," IEEE Biomedical Circuits and Systems Conference (BIOCAS) Proceedings, 544-547 (2014).

(Continued)

Primary Examiner — Albert H Cutler
(74) Attorney, Agent, or Firm — HoustonHogle LLP; J. Grant Houston

(57) ABSTRACT

An event based pixel sensor system employs regions of interest or regions of non-interest, which are preferably dynamic, to isolate change events and reduce data from non-interesting events.

18 Claims, 17 Drawing Sheets

(56) References Cited

U.S. PATENT DOCUMENTS

| | | | |
|---|---|---|---|
| 2018/0191972 A1 | 7/2018 | Berner et al. | |
| 2019/0007690 A1* | 1/2019 | Varadarajan | G06V 20/46 |
| 2019/0052820 A1* | 2/2019 | Berner | H04N 5/37452 |
| 2020/0410272 A1* | 12/2020 | Seo | G06V 10/22 |

OTHER PUBLICATIONS

Guo, H., et al., "Dynamic Resolution Event-Based Temporal Contrast Vision Sensor," IEE International Symposium on Circuits and Systems (ISCAS), 1422-1425 (2016).

Hofstatter, M., et al., "An Integrated 20-Bit 33/5M Events/s AER Sensor Interface with 10ns Time-Stamping and Hardware-Accelerated Event Pre-Processing," Biomedical Circuits and System Conference, 257-260 (2009).

International Preliminary Report on Patentability, dated Jan. 13, 2022, from International Application No. PCT/IB2020/056201, filed on Jun. 30, 2020. 9 pages.

International Search Report of the International Searching Authority, dated Aug. 24, 2020, from International Application No. PCT/IB2020/056201, filed on Jun. 30, 2020. 4 pages.

Written Opinion dated Aug. 24, 2020, from International Application No. PCT/IB2020/056201, filed on Jun. 30, 2020. 7 pages.

Delbruck, T. et al., "Fast sensory motor control based on event-based hybrid neuromorphic-procedural system", Circuits and Systems, ISCAS 2007, IEEE International Symposium O N, IEEE May 1, 2007, pp. 845-848.

\* cited by examiner

DYNAMIC REGION OF INTEREST (ROI) FOR EVENT-BASED VISION SENSORS

RELATED APPLICATIONS

This application is a § 371 National Phase Application of International Application No. PCT/IB2020/056201, filed on Jun. 30, 2020, now International Publication No. WO 2021/001760, published on Jan. 7, 2021, which claims the benefit under 35 USC 119(e) of U.S. Provisional Application No. 62/869,311, filed on Jul. 1, 2019, both of which are incorporated herein by reference in their entirety.

BACKGROUND OF THE INVENTION

Today, machine vision is mostly based on conventional cameras and their associated frame-based, spatially resolved optical sensors. For some machine vision tasks, e.g., object recognition, these conventional frame-based cameras, with their image-based optical sensors, are well suited. However, for other tasks, e.g., monitoring, tracking or position and motion estimation, the conventional image sensors have drawbacks.

The main drawback is that conventional cameras produce a significant amount of redundant and unnecessary data, which has to be captured, communicated and processed. This high data load slows down the reaction time by decreasing temporal resolution, results in increased power consumption, and increases the size and cost of machine vision systems. In addition, most image sensors suffer from limited dynamic range, poor low-light performance and motion blur.

On the other hand, so-called Dynamic Vision Sensors (DVS) overcome the limitations of frame-based encoding. See U.S. Patent Application Publication No. US 2008/0135731, by Lichtsteiner et al., entitled "Photoarray for Detecting Time-Dependent Image Data", which is incorporated herein by this reference. These spatially-resolved optical sensors use in-pixel data compression to remove data redundancy. They can also achieve high temporal resolution, low latency, low power consumption, and high dynamic range with little motion blur. The DVS-type of optical sensor is thus well suited, especially for solar or battery powered compressive sensing or for mobile machine vision applications where the position of the system has to be estimated and where processing power is limited due to limited battery capacity.

The DVS pre-processes visual information locally. Instead of generating crisp images, the DVS produces smart data for computer applications. While conventional image sensors capture a movie as a series of still images, the DVS detects and only transmits the position of changes in a scene. It encodes the visual information much more efficiently than conventional cameras because it does so by in-pixel data compression. This means that processing of data is possible using fewer resources, lower net power and with faster system reaction time. The high temporal resolution allows continuously tracking visual features and thereby overcoming the correspondence problem. Additionally, the architecture of DVS allows for high dynamic range and good low-light performance.

Event-based vision sensors (EVBS) are often but not always variants of the original DVS architectures. As a general rule, the pixels of EVBS's operate asynchronously at least in portions of their pixels without a periodic sampling rate and emit a so-called DVS address event as soon as they perceive a luminance change exceeding an adjustable threshold. In other examples, they produce binary (or ternary) images. ON events are associated with an increase in luminance exceeding the threshold; and OFF events are associated with a decrease in luminance exceeding the threshold at a given pixel.

SUMMARY OF THE INVENTION

Event-based vision sensors allow processing efficiency because they only transmit data about changes in a scene. As a result, event-based vision sensors are especially good at tracking moving or changing objects. Often, however, not all objects and other features of a scene are interesting/used for further processing. The present invention concerns avoiding the transmission of the data of uninteresting scenic features to improve the overall system performance and efficiency.

According to one aspect, the inventive sensor only transmits events with addresses within one (or several) dynamic regions of interest (dROI) that are smaller than the total event based pixel array. The position of the dROI will typically follow the activity (using some kind of activity tracking and/or object tracking algorithm). Usually, the position of the dROI may be controlled/calibrated from time to time by a controller. This controller may be situated on the same chip as the sensor, in a system on chip, in a system in package, or may be implemented in a separate device/component. Moreover, the controller may be implemented as software code executing on a processor, or it may be implemented in hardware. The position of the dROI may be updated by a predictive algorithm such as Kalman filter. And, the position of the dROI may be controlled by a combination of a simple algorithm that is updated very often and a more sophisticated algorithm that is run less often. In addition, the size of the dROI will often be increased as the uncertainty of the position of the object to be tracked increases. In general, the dROI may have an arbitrary shape and resolution and may or may not be contiguous.

Generally, the invention features an event based pixel sensor system employing regions of interest and/or regions of non-interest, which are preferably dynamic, to isolate change events and reduce data from non-interesting events.

In general, according to one aspect, the invention features an event based pixel sensor system that comprises an event based pixel array including event based pixels that detect change events and a dynamic region of interest block that defines one or more regions within the array to isolate change events.

In some examples, the dynamic region of interest block defines one or more regions of interest from which change events are processed and/or defines one or more regions of non interest from which change events are ignored.

As is characteristic of many EBVSs, each of the pixels comprises a photoreceptor for detecting light and a comparator for comparing an output of the photoreceptor to reference voltage. Each of the pixels often further comprises a capacitor for remembering a past signal from the photoreceptor. In operation each of the pixels resolves ON change events and/or OFF change events.

In some examples, the dynamic region of interest block filters change events read from the event based pixel array based on the one or more regions.

In many cases, one or more activity trackers, which are implemented in the dynamic region of interest block and/or a separate processing unit, are used for updating the one or more regions.

Preferably, the dynamic region of interest block is implemented in the same chip as the event based pixel array. This way, events are filtered in the sensor which reduces the processing that must be performed by the processing unit, for example.

In general, according to one aspect, the invention features a method for an event based pixel sensor system. This method comprises detecting change events in an event based pixel array and defining one or more regions within the array to isolate change events.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
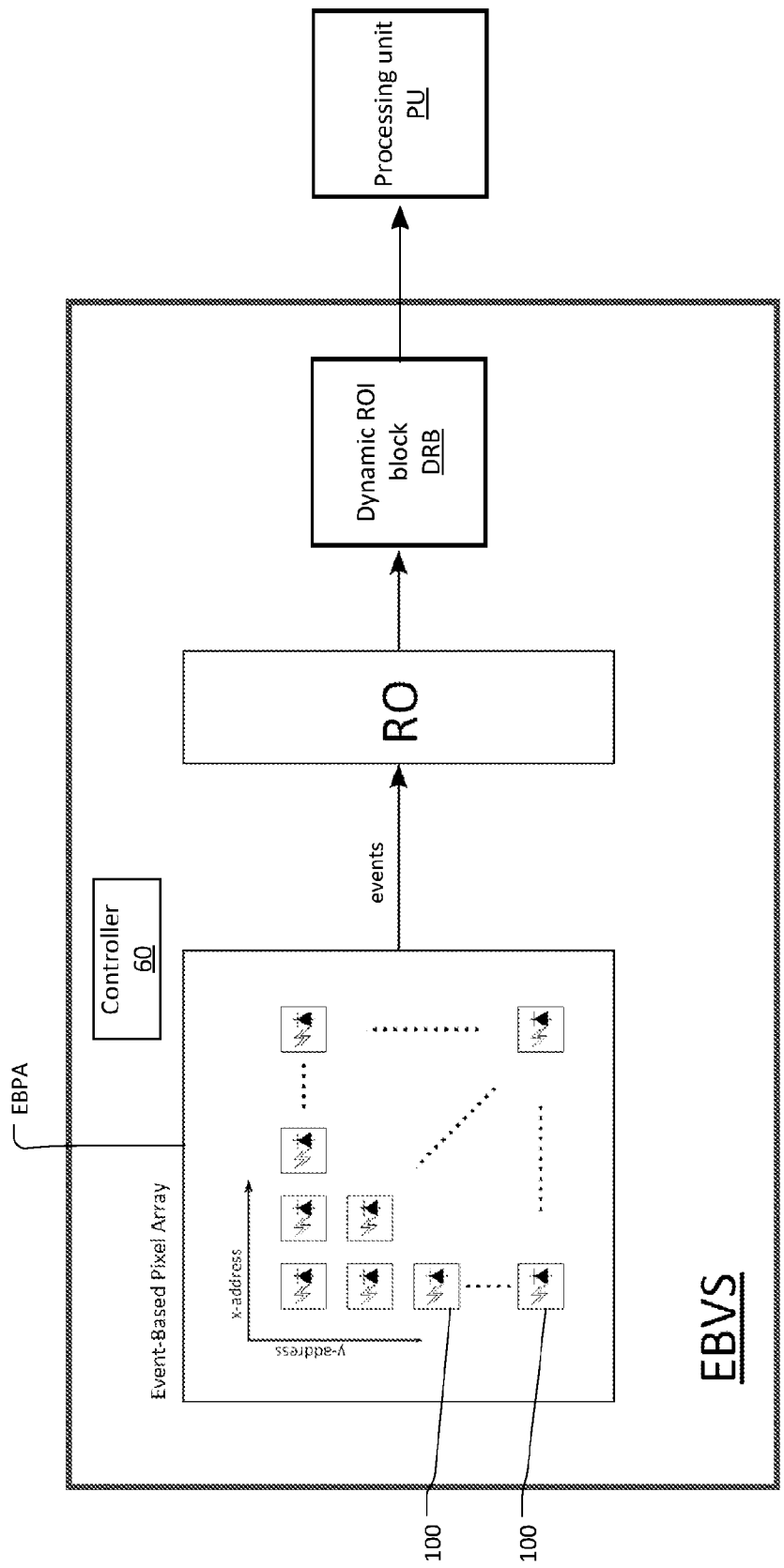
FIG. 1 schematically shows an event-based optical sensor system: an event-based optical sensor generates data (change events) from the light detection pixel array and transmits this data to a processing unit that receives and saves the data and is also the same processing unit that performs the elaboration on the same data. This event-based optical sensor system employs a dynamic region of interest block (DRB) that is part of the EBVS for isolating change events.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Definitions

An Event-Based Pixel Array (EBPA) is an array of pixels containing photosensitive devices and pixel circuits that take as input the output signal of the photosensitive devices; these pixels (combining photosensitive devices and pixel circuits), spatially and/or temporally independently from each other, generate discretized data as a function of the light radiation by which they are hit.

An Event-Based Vision Sensor (EBVS) is a sensor that outputs data extracted and/or elaborated from an EBPA.

The System Latency is defined as the time between a light change and the output of the data elaboration. Events are expected to be grouped in packets. The number of events in each packet is arbitrary and may be zero or one. A packet may contain all events that fall within some window of time. Specifically all embodiments where events are sent separately shall be included and understood as packets with size of one event.

Read-out Circuit (RO): circuitry that extracts events (or event data) from an EBPA.

Memory Controller (MC): circuitry that writes data to a memory, having the capability of selecting a specific address of the memory, to which a specific data is written.

Pixel Address (k): number, or list of numbers, that represents the position of a pixel in a pixel array.

Memory Address (m): number, or list of numbers, that represent a location in a memory and that can be used to access that location of the memory for reading or writing data.

FIG. 1 shows an event-based vision sensor EBVS according to the present invention.

The sensor EBVS has an event-based pixel array EBPA and a read-out circuitry RO that reads the events generated by the array EBPA and outputs them to a processing unit PU, in the form of an event data stream.

The event-based pixel array EBPA comprises a two dimensional array of event-based change detection sensors or pixels 100 (such as proposed in PCT/IB2017/058526 (published as International Pub. No. WO 2018/122798 A1) or U.S. Pat. No. 7,728,269 B2 or U.S. Pub. No. 2018/0191972 which are incorporated herein by this reference in their entirety). The event-based pixel array EBPA generates event data, for example in the form of the addresses of the pixels 100 that detected a light change. Each of these addresses encodes the position of a pixel in the array, often in the form of two numbers representing x-y coordinates. Another possible output format of the data is a binary (or ternary) image, where pixels with an event are marked with a logic 1, while pixels that have not detected an event are marked with a logic 0. Or in case differentiating between ON and OFF events is desired, pixels with an ON event may be marked with a 1, while pixels with an OFF event are marked with a −1.

Throughout this document we assume that the output data of the EBVS is encoded in the form of addresses. Nevertheless, the basic principles are equally applicable to systems that generate binary or ternary images, along with other formats.

The processing unit PU can take a number of different forms: The processing unit PU will often be an applications processor, embedded controller such as a microcontroller or application specific integrated circuit (ASIC). In other examples, the processing unit PU is an external device such as a central processing unit (CPU), separate microcontroller, separate digital signal processor (DSP)) that is saving this data in a memory. The processing unit PU may be connected directly to the EBVS and located on the same printed circuit board, or the PU may be connected via some wired interface such as USB or Ethernet (IEEE 802.3 protocol interface) or a wireless interface such as WiFi (IEEE 802.11 protocol interface), to list a few examples. In one specific example, the processing unit is the central processing unit or image or graphic coprocessing unit of a mobile computing device (such as a smartphone or tablet computing device), a robot, or an autonomous drone or vehicle.

The processing unit PU may save the event data to a memory, which is then accessed to perform data elaboration (which could be for example face tracking, simultaneous localization and mapping or landmark tracking), typically by the same processing unit PU that received the data in the first place. Often, the event data received from the sensor has to be elaborated by the processing unit before being saved to the memory, to convert it to a format compatible with the memory or with the subsequent elaboration steps.

According to the invention, the event-based vision sensor EBVS includes a dynamic region of interest processing block DRB that filters the output of the event-based pixel array EBPA and/or controls the EBPA and/or controls the readout RO, to reduce the amount of data that has to be transmitted to the processing unit PU. The DRB is configured so that it filters events that are outside of a region of interest, where this region of interest follows activity detected in the EBPA.

According to many embodiments of the invention, the dynamic region of interest processing block DRB is part of the event-based vision sensor EBVS in the sense that the DRB and EBVS are in the same chip and in a common chip package. This chip package is then installed on a printed circuit board. In fact, in many examples, the dynamic region of interest processing block DRB is part of the event-based vision sensor EBVS and fabricated on the same silicon die as the event-based pixel array EBPA, readout circuit RO, and controller 60. This silicon die is typically packaged in a windowed package that allows light to reach the event-based pixel array EBPA but protects the logic circuits of dynamic region of interest processing block DRB. Nevertheless, in other examples, the event-based pixel array EBPA and dynamic region of interest processing block DRB are fabricated in separate silicon dies, which are then stacked or otherwise co-packaged into the same chips that is mounted on a printed circuit board.

Figure 2:
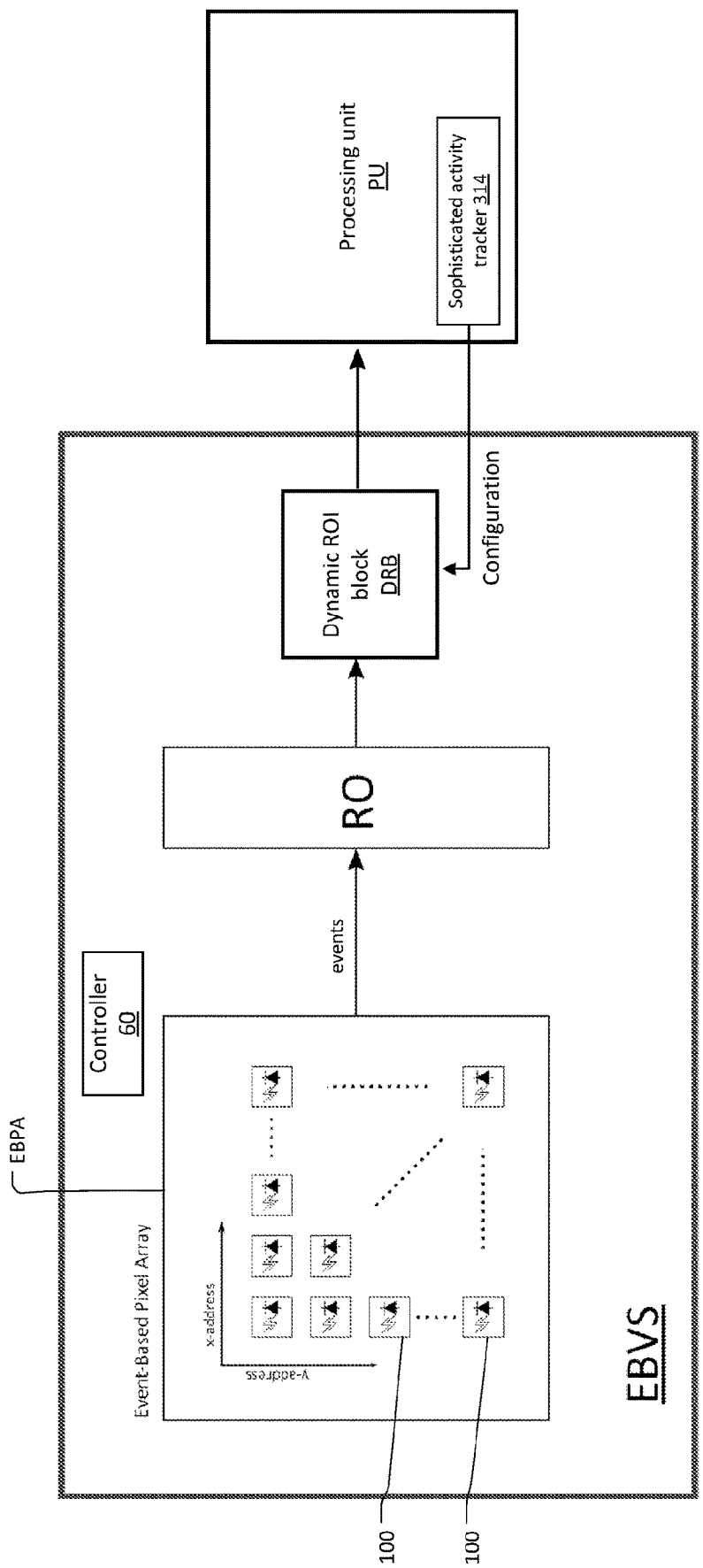
FIG. 2 schematically shows an event-based optical sensor system employing a dynamic region of interest block DRB that is part of the EBVS, which works in conjunction with a sophisticated activity tracker that is implemented on the processing unit PU.

FIG. 2 shows the event-based vision sensor EBVS connected to the processing unit PU. As described previously, the EBVS contains the dynamic region of interest processing block DRB that filters the output, thus reducing the amount of data that has to be transmitted to the processing PU. The DRB is configured so that it filters events that are outside of a region of interest, where this region of interest follows activity detected in the EBPA.

In this embodiment, a sophisticated activity tracker 314 is implemented on the processing unit PU. This sophisticated activity tracker configures and updates the dynamic region of interest processing block DRB to improve tracking accuracy. Typically, the sophisticated activity tracker 314 is a processing thread that executes on the processing unit PU, or one of its processing cores or it could be part of an app or other program that executes on an operating system of the processing unit. In this way, the operation of the dynamic region of interest processing block DRB is controlled externally from the sensor EBVS.

Figure 3:
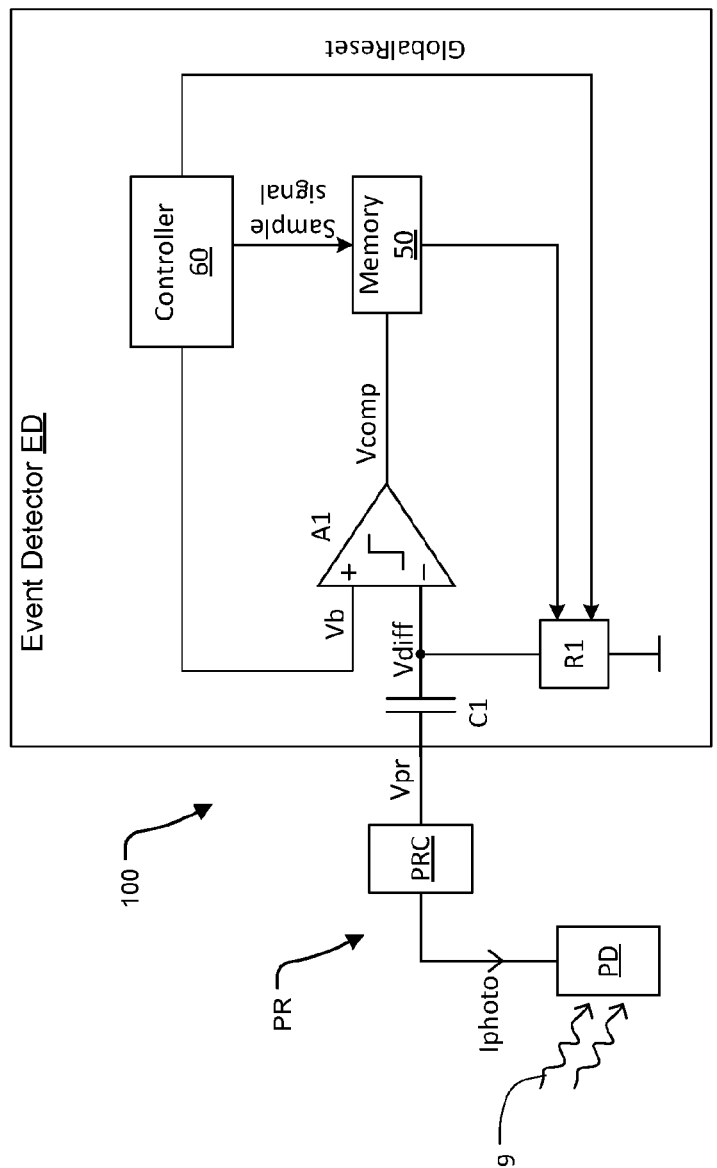
FIG. 3 is a circuit diagram showing a state of the art pixel implementation for an event-based optical sensor, e.g. according to PCT/IB2017/058526 and U.S. Pub. No. 2018/0191972.

FIG. 3 shows an example of a pixel of the EBPA of an EBVS in the above described systems. It is taken from PCT/IB2017/058526 and U.S. Pub. No. 2018/0191972, which is incorporated herein by this reference in its entirety. However, the core concepts in the proposed invention can be applied to virtually any Event-Based Vision Sensor realized as an integrated circuit, not depending on any specific pixel architecture used, such as the specific pixel architecture described below.

The major components of a pixel circuit 100 are enumerated below.

1. Photoreceptor module. As shown in the figure, the pixel circuit 100 contains a photodiode PD, or other photosensor, to measure impinging light 9 and convert the light intensity to current Iphoto; a photoreceptor circuit PRC to generate a photoreceptor signal Vpr dependent on the light intensity; and a memory capacitor C1 to remember past photoreceptor signal. The photosensor PD and photoreceptor circuit PRC constitute the photoreceptor module PR.

2. Memory capacitor C1: Receives the photoreceptor signal Vpr such that first plate of the capacitor carries a charge that is responsive to the photoreceptor signal Vpr and thus the light received by the photosensor PD and is part of the event detector ED. A second plate of the memory capacitor C1 is connected to the comparator node (inverting input) of A1. Thus the voltage of the comparator node, Vdiff, varies with changes in the photoreceptor signal Vpr.

3. Comparator A1: This is a means to compare the difference between current photoreceptor signal Vpr and past photoreceptor signal to a threshold and is part of the event detector ED. This comparator A1 can be in each pixel, or shared between a subset (for example a column) of pixels. In the preferred embodiment the comparator will be integral to the pixel, with each pixel having a dedicated comparator A1.

4. Pixel memory: Pixel memory 50 stores the comparator output based on a sample signal from a controller 60 and is part of the event detector ED. Memory can be a sampling circuit (for example a switch and a parasitic or explicit capacitor) or a digital memory circuit (a latch or a flip-flop). In one embodiment, the memory will be a sampling circuit and each pixel will have two memories.

5. A conditional reset circuit R1: Condition for reset is a combination of the state of the memorized comparator output and a reset signal applied by the controller 60 and is part of the event detector ED.

6. Peripheral circuit components: The comparator A1 and the memory 50 can be located in the pixel or in peripheral circuits (outside the pixel circuit).

The peripheral circuits contain the controller 60 that represents the control logic for the event based pixel array EBPA. The controller 60 applies threshold signals to the comparator A1, sends control signals to memory 50 and selects times when the conditional reset circuit R1 becomes active.

The peripheral circuits will also typically contain the readout circuit, which reads the content of the memory 50, determines if the light intensity for a given pixel has increased, decreased, or unchanged, and sends the output (computed from the current memory value) to a processor.

In more detail, the comparator discriminates if light has increased/decreased. For an OFF event: if Vdiff is lower than the threshold Voff (on Vb), the comparator output is high, and this level is stored in the memory. This means a decrease is detected. If Vdiff is not lower than the threshold, the comparator output is low: no decrease detected.

The only difficulty is that for an ON event, a low comparator output means an increase, while a high output means no change; but for OFF event high comparator output means decrease while low means no change.

So the readout must know the memory content and which threshold was applied.

The pixel circuit 100 and controller 60 operate as follows.

A change in light intensity received by the photosensor PD will translate to a change in photoreceptor signal Vpr. When the reset circuit R1 is not conducting, the changes in Vpr will be reflected also in the voltage Vdiff at a comparator node at the inverting input (−) to the comparator A1. This occurs because the voltage across the memory capacitor C1 stays constant.

At times selected by the controller 60, the comparator A1 compares the voltage at the comparator node at the second terminal of the memory capacitor C1 (Vdiff) to a threshold voltage Vb (from controller) applied to the non-inverting input (+) of the comparator A1.

The controller 60 operates the pixel memory 50 to store the comparator output Vcomp. The memory 50 is typically implemented as part of the pixel circuit 100 as shown. In other embodiments, however, the memory 50 is implemented as part of column logic circuit (peripheral circuit, one per each column of the pixel array).

If the state of the stored comparator output held in the memory 50 indicates a change in light intensity AND the global reset signal GlobalReset signal from the controller 60 is active, the conditional reset circuit R1 is conducting. Here "AND" indicates the logical AND operator. With the conditional reset circuit R1 in a conductive state, the voltage at the comparator node at the inverting input of the comparator A1 (Vdiff) is reset to a known level. Thus, it stores the current photoreceptor signal Vpr on the memory capacitor C1.

Regions of Interest

Embodiments of the present invention concern the creation of one or more regions of interest within the EBPA. This allows the system to reduce the transmission of data of uninteresting features to improve the overall system performance and efficiency.

Figure 4A:
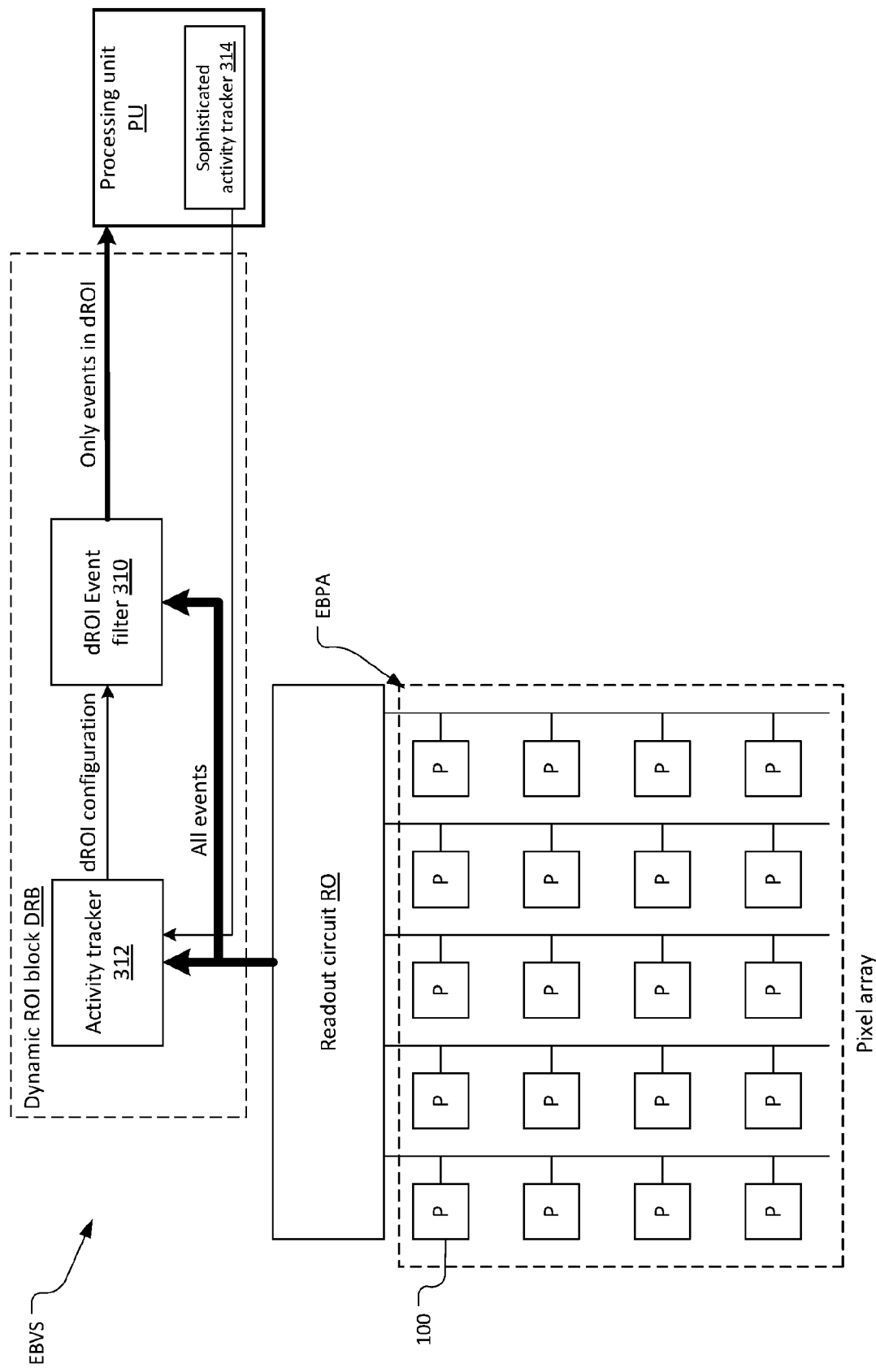
FIG. 4A is a schematic diagram showing a sensor system where the dynamic region of interest block DRB is implemented with an activity tracker 312 and a dROI event filter 310. The output from the readout circuit is processed by the activity tracker and a dROI event filter, which is controlled by the activity tracker.

FIG. 4A shows a block diagram of an EBVS that implements a dynamic region of interest block DRB including an activity tracker 312 and an event filter 310. The activity tracker 312 tracks activity in the output of the EBPA, and configures the event filter 310, which lets pass only events that occurred inside a region defined by the activity tracker.

Here the event filtering is done after reading events from the array. That is, all events are read from the event based pixel array EBPA by the readout circuit RO. But only the events that are within the dROI are further processed and sent to off of the EBVS chip and to the processing unit PU. Additional to the pixel array EBPA with readout, the event-based vision sensor EBVS comprises the activity tracker 312, and the event filter 310, which typically are implemented on the vision sensor EBVS, on the same chip and possibly even on the same silicon die. This embodiment with the filter is most easily implemented with rectangular dROI shapes (the dROI is parameterizable with few parameters).

Nevertheless, in some embodiments, the sophisticated activity tracker 314 runs on the processing unit to push down updates to the dynamic regions of interest dROI when required and/or on a periodic basis.

Figure 4B:
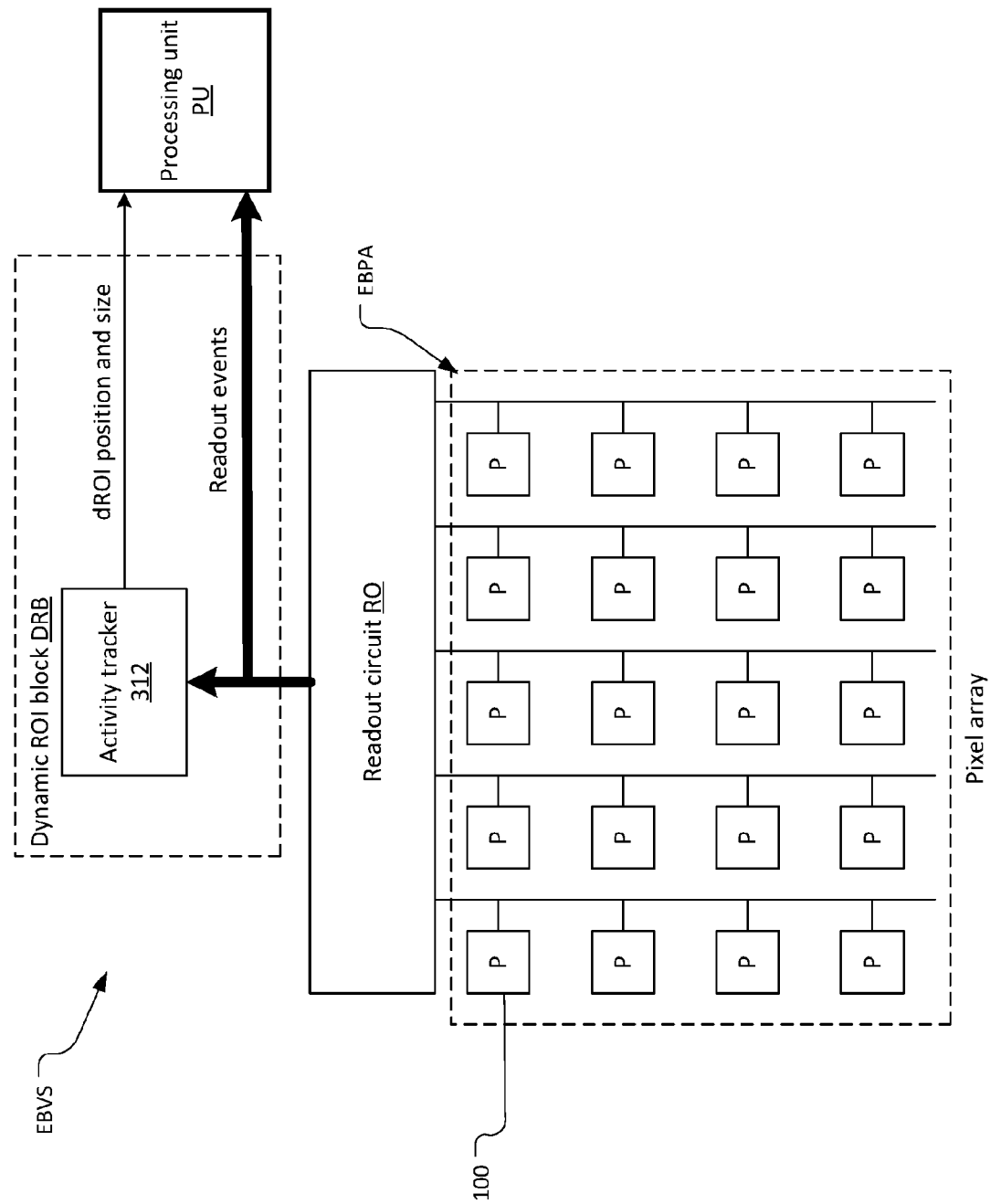
FIG. 4B is a schematic diagram showing another embodiment of the sensor system where the output from the readout circuit is processed by an activity tracker. In this embodiment, the position and size of the activity tracker are output of the sensor.

FIG. 4B is a schematic diagram showing another embodiment where the output from the readout circuit RO is processed by the activity tracker 312.

Here the event filtering is done after reading events from the array. Additional to the pixel array with readout, the system contains an activity tracker. Instead of outputting filtered events, only dROI position (and optionally size) is output along with the events from the readout circuit. In this example, the processing unit will receive both of the events and the dROI position and size. Then, the processing unit will then decimate events based on the region of interest, such as decimating events that are outside the one or more regions of interest. While this embodiment, does not conserve communication bandwidth between the event based vision sensor EBVS and the processing unit as efficiently as other embodiments, the embodiment still conserves event processing on the processing unit by allowing filtering based on the regions of interest parameters.

Figure 5:
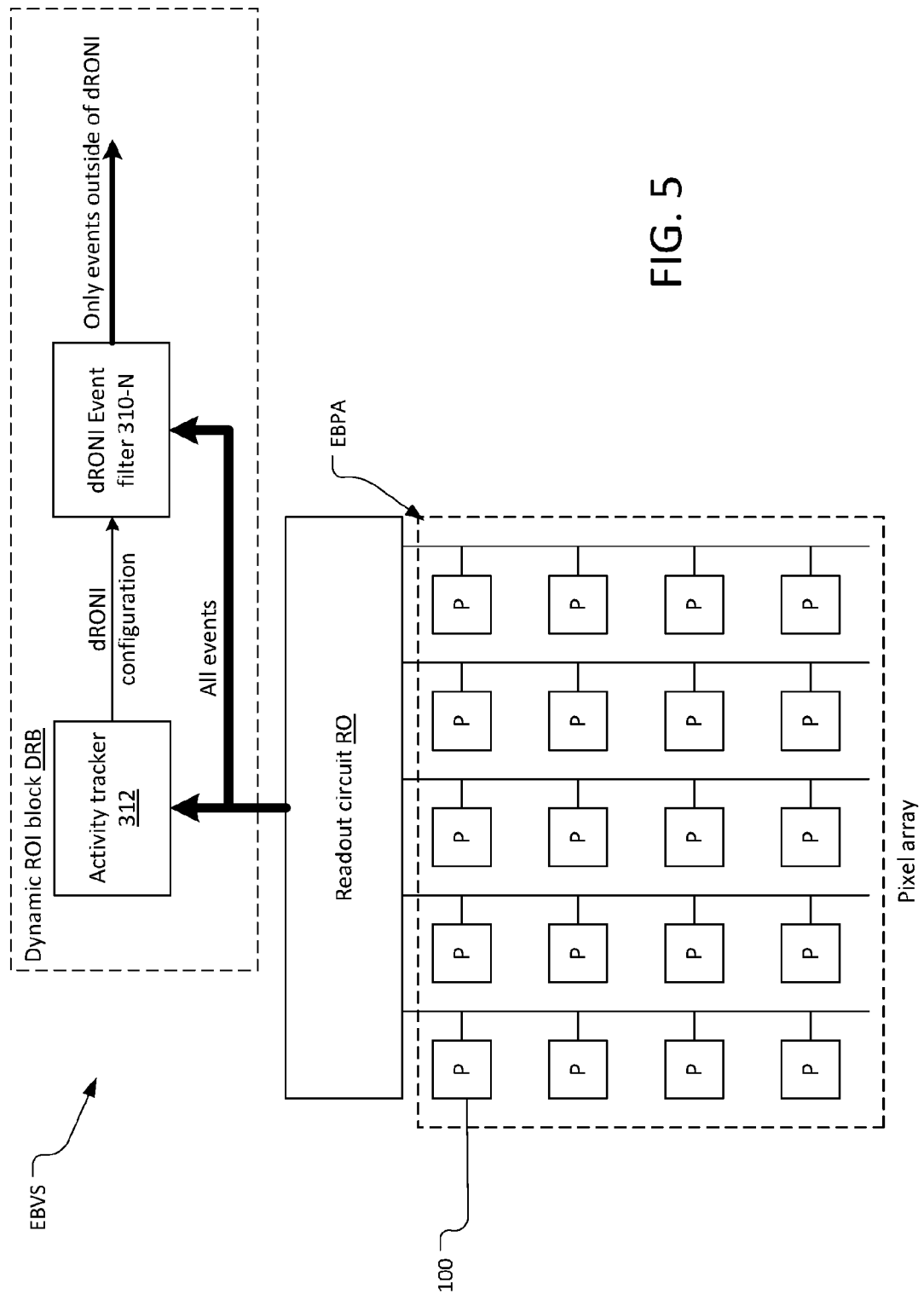
FIG. 5 is a schematic diagram showing a sensor system where the output from the readout circuit is processed by an activity tracker and a dynamic region of noninterest (dRONI) event filter, which is controlled by the activity tracker.

FIG. 5 is a schematic diagram showing the EBPA of the EBVS where the output from the readout circuit RO is processed by an activity tracker and a dynamic "region of non-interest" (dRONI) event filter 310-N, which is controlled by the activity tracker. Thus, instead of letting pass the events that are within a window, the filter blocks the events in the window.

Figure 6:
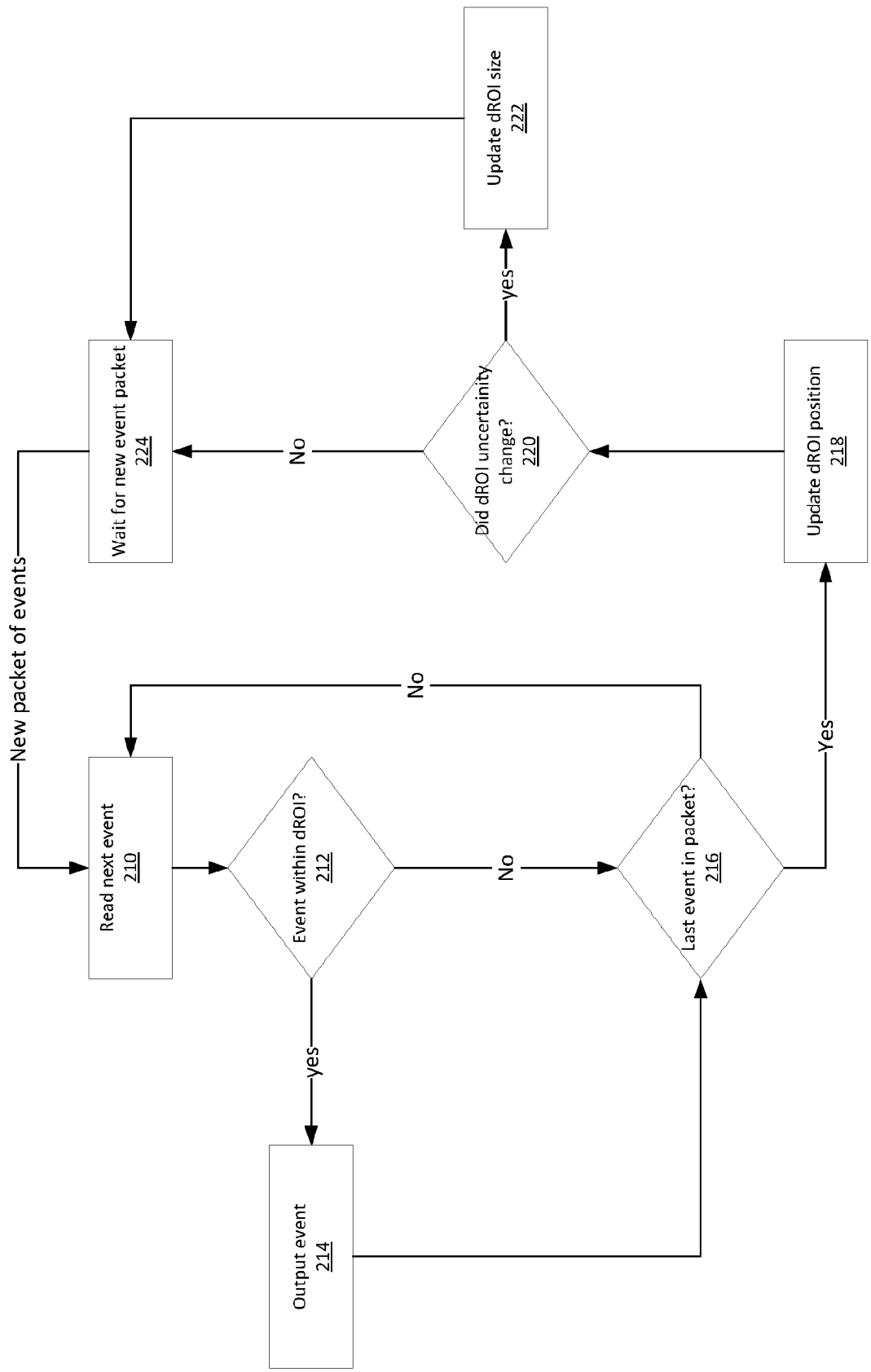
FIG. 6 is a flow diagram showing the basic operation of EBVS having a dynamic region of interest according to the principles of the present invention when the events are processed in packets.

FIG. 6 is a flow diagram showing the basic operation of EBVS operating according to the principles of the present invention when the events are processed in packets. It should be noted, however, that an event package could contain only a single event.

In step 210, the next event is read by the dynamic ROI block DRB from the event based pixel array EBPA. In step 212, DRB determines whether the event is in the region of interest. If the event is in the region of interest, the event is output and/or saved in step 214. For events not in the region of interest, those events are skipped. All of the events are assessed in this process until the last event is found in step 216.

In step 218, the dynamic ROI block DRB determines whether the position of the region of interest within the event based pixel array should be updated by the processing. Typically the activity tracker 312 will analyze the location of events within the dynamic region of interest and then update the location of the dynamic region of interest so that the events are centered in that region. In some cases, where the events exhibit a trajectory across the array, the activity tracker 312 locates the dynamic region of interest where it will expect the next events to appear.

In step 220, the activity tracker 312 determines whether or not the dynamic region of interest uncertainty has changed. Uncertainty relates to the ability of the activity tracker 312 to predict the location of the next events in the array. If there is a high degree of uncertainty, then the activity tracker 312 will typically make the dynamic region of interest larger. On the other hand, if the uncertainty is low and the activity tracker 312 can well-predict the location of the next events, then the dynamic region of interest is made smaller. In these cases, then the size of the dynamic region of interest is changed in step 222. Then, finally in step 224, the system waits until the new event packet is received in step 224.

In this way, only events that fall within the dynamic region of interest (dROI) are provided as an output.

Also shown is how the position of the dROI is additionally updated. In addition, the size of the dROI is updated.

In general, the dROI is employed to identify events generated by parts of the scene or objects that are of interest (for example a user's hand in a gesture system or other moving object. The dROI is typically updated by the events (for example simple tracker) where each event moves the center of the dROI slightly into its direction. The position of the dROI might be updated by a predictive algorithm such as a Kalman filter in some embodiments. Moreover, the dROI in some cases is square, rectangular, circular or oblong. That said, in other examples, the dROI may have an arbitrary shape and resolution and may or may not be contiguous.

Figure 7:
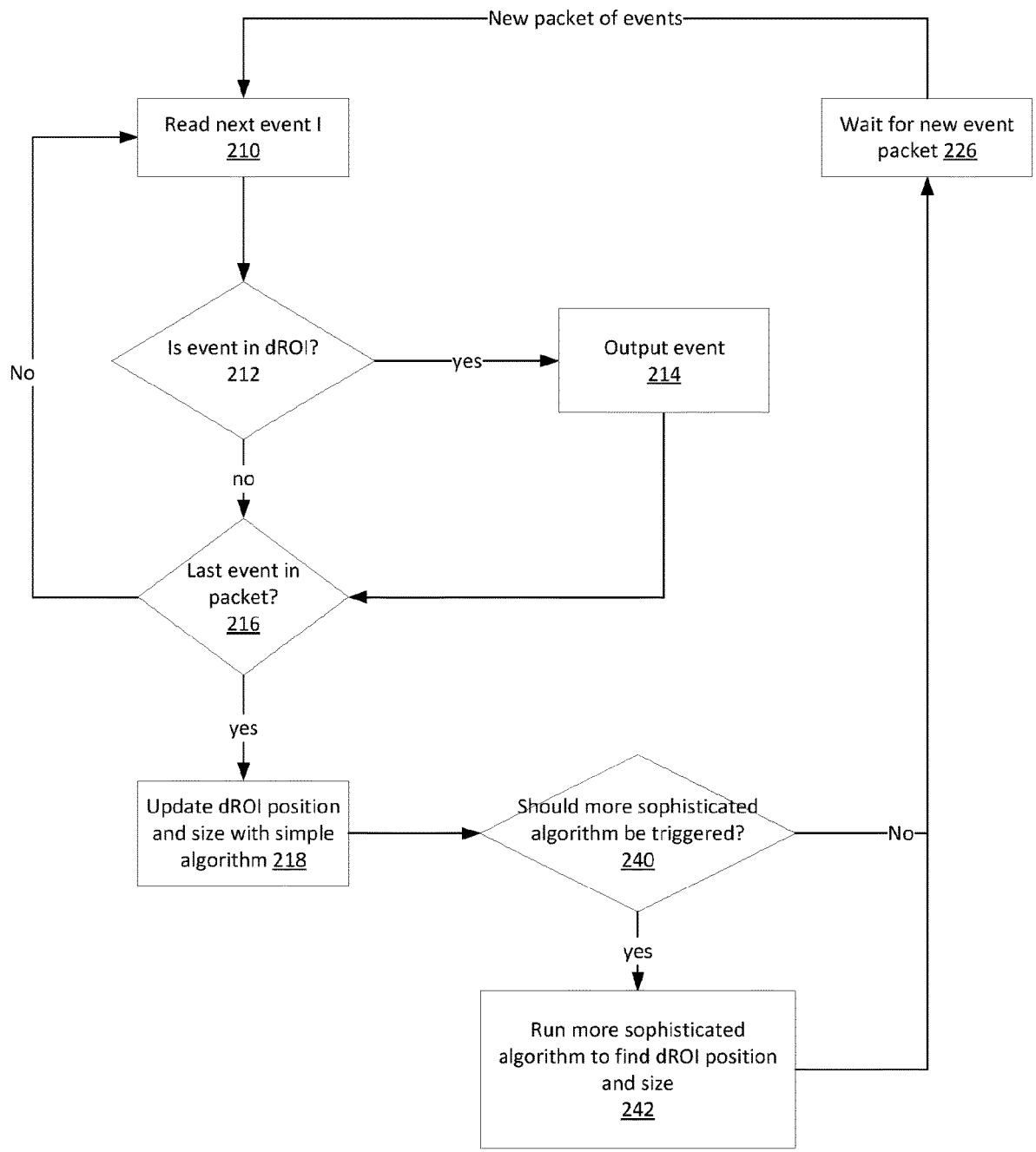
FIG. 7 is a flow diagram showing the operation of EBVS having two activity trackers.

FIG. 7 is a flow diagram showing the operation of EBVS having two activity trackers.

In more detail, as described previously, the position and size of the dROI is updated in step 218.

However, in a subsequent step 240, it is determined whether or not a more sophisticated update algorithm should be triggered. Times when a more sophisticated algorithm would be triggered include when a timeout occurred, when the dROI size increased below or above a threshold.

Then, in step 242, the more sophisticated algorithm is run to update the position and size of the dROI. Examples of such a more sophisticated algorithm include for example a Kalman filter or a keypoint tracker.

Figure 8:
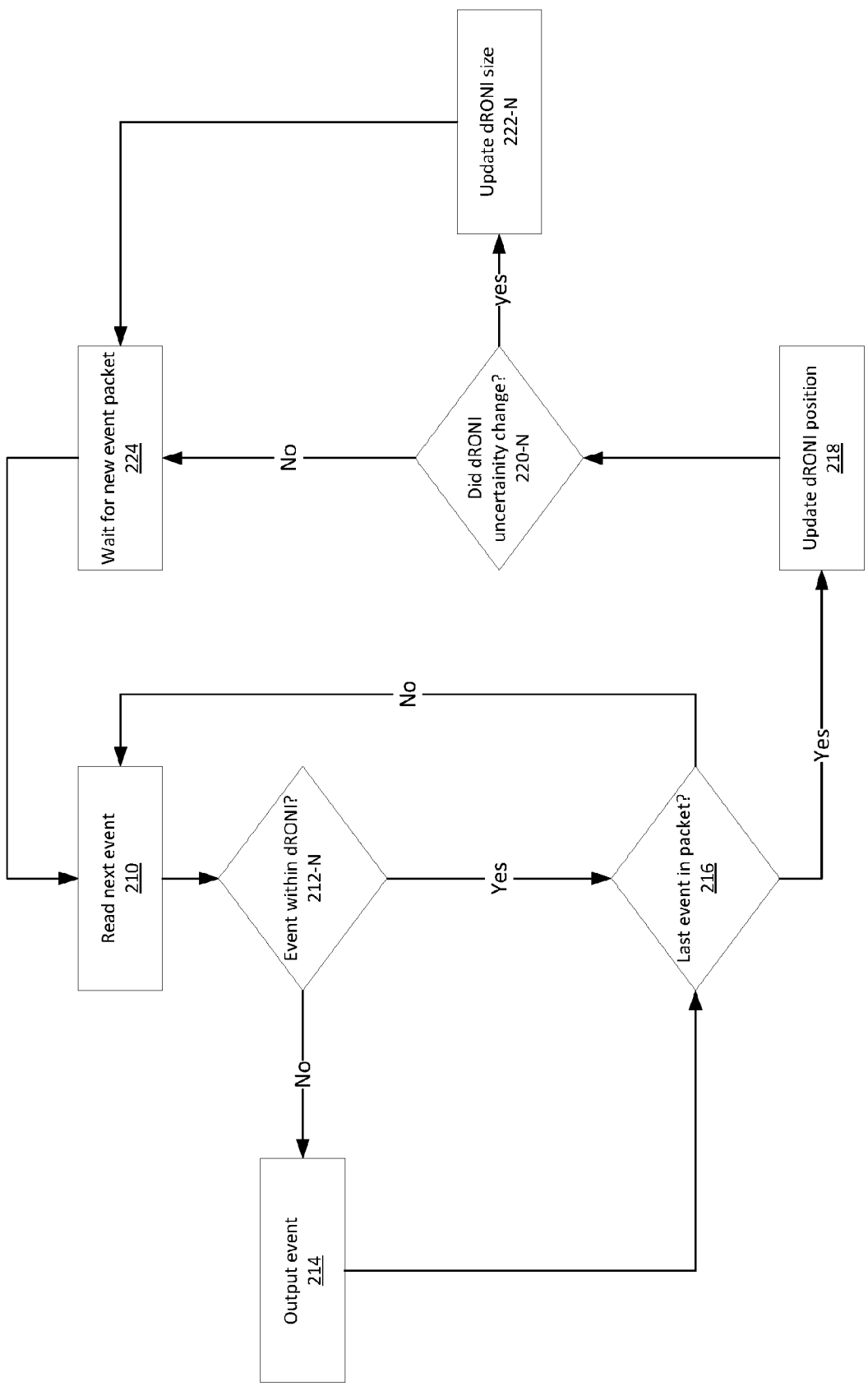
FIG. 8 is a flow diagram showing the basic operation of EBVS having a dynamic region of non-interest according to the principles of the present invention when the events are processed in packets.

FIG. 8 is a flow diagram showing the basic operation of EBVS operating according to the principles of the present invention when the events are processed in packets and only events that fall outside a dynamic region of noninterest (dRONI) are output from the EBVS.

The dynamic "region of non-interest" (dRONI) is employed to block events generated by parts of the scene or objects that are not of interest (for example flickering lights or objects that should be ignored). Specifically, the activity tracker determines whether events are outside the dRONI in step 212-N so that only those outside events are output in step 214. The position of the dRONI can be updated by the events (for example simple tracker where each non-interesting event moves the center of the dRONI slightly into its direction). The position of the dRONI may be updated by a predictive algorithm such as a Kalman filter that is used to track regions of the EBPA that are associated with non-interesting events in step 222-N. The dRONI similarly in some cases is square, rectangular, circular or oblong. That said, in other examples, the dROI may have an arbitrary shape and resolution and may or may not be contiguous.

Sophisticated Activity Tracker

In addition, the system can use a combination of a simple activity tracking algorithm and a sophisticated activity tracking algorithm. The simple activity tracker is updated frequently, the sophisticated one is updated less often to save computational load. Typically, the simple activity tracker is implemented on the event based vision sensor EBVS whereas the sophisticated activity tracker is implemented by the processing unit PU, as shown in FIG. 2.

Nevertheless, the sophisticated activity tracker can be integrated into the EBVS and thus on the same chip as the EBPA, or in a processor that is included in the sensor chip.

The more sophisticated activity tracking algorithm might be triggered at regular time intervals or by some other criteria (for example the uncertainty of a Kalman filter is bigger than some threshold).

Figure 9:
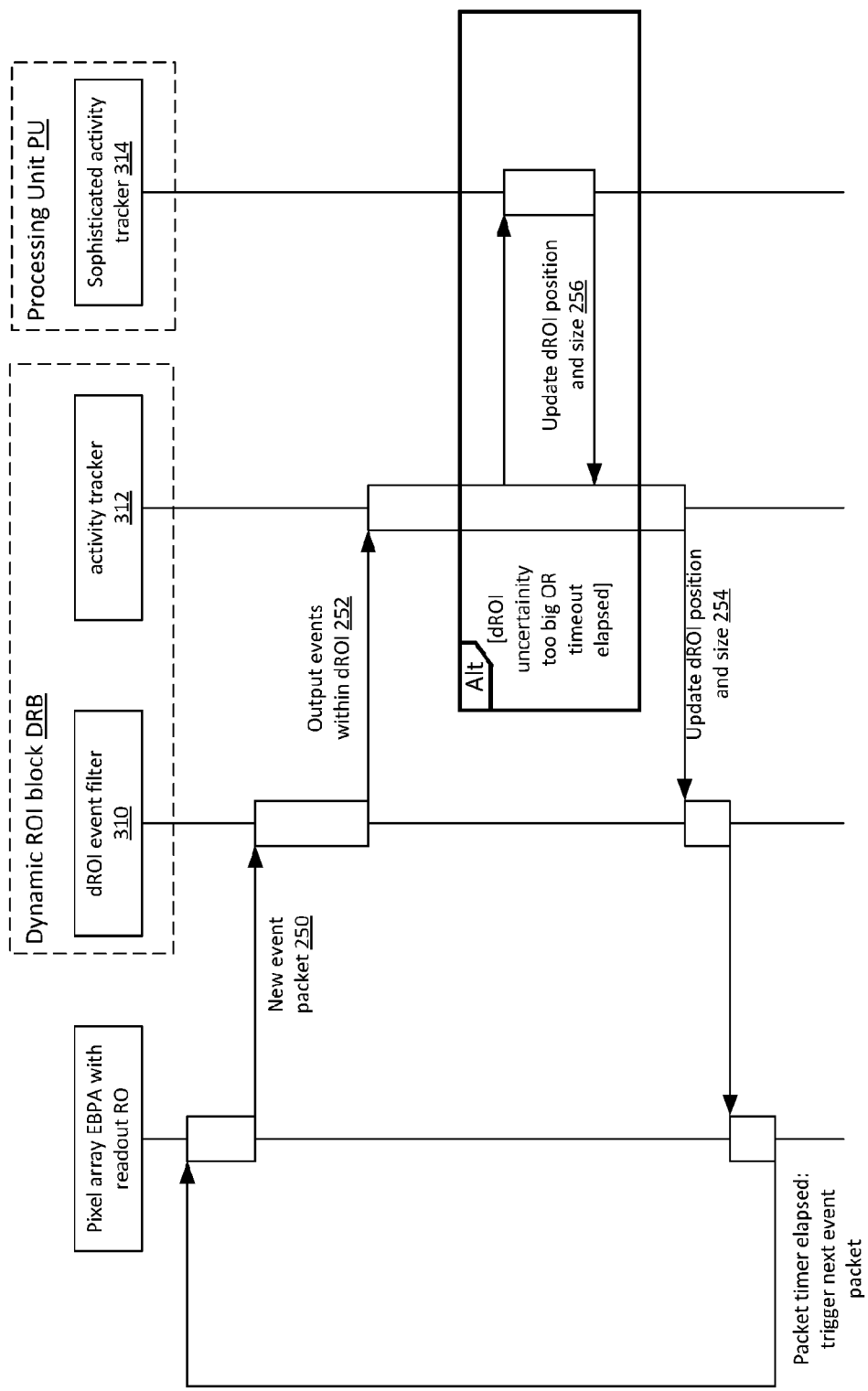
FIG. 9 is a sequence swimlane diagram showing how the EBPA interacts with a dROI event filter and a simple activity tracking process and a sophisticated activity tracking process that executes on the processing unit.

FIG. 9 is a sequence diagram showing how the EBPA interacts with a dROI event filter and a simple activity tracking process, of the dynamic ROI processing block DRB, and a sophisticated activity tracking process that executes on the processing unit.

Specifically, the event based pixel array EBPA along with the readout circuit RO produce the new event packet 250. The dynamic region of interest event filter 310 produces the output events 252 that are within the dynamic region of interest. These events are passed to a simple activity tracker 312. This tracker typically produces the updated position and size of the dROI 254 unless the uncertainty is too large or a timeout period has elapsed. In this case, then the output events are passed to a sophisticated activity tracker 314 that updates both the region and size of the dynamic region of interest 256.

When the output events are passed to the sophisticated activity tracker 314 often all of the current events are passed. Thus, for example, in the embodiment of FIG. 4A, the event filter 310 is temporarily deactivated such that all events from the event based pixel array are forwarded to the processing unit so that the sophisticated activity tracker executing on the processing unit will have knowledge of all recent events so that it forces updates of both the region and size of the dynamic region of interest 256 back to the activity tracker 312 of the event based vision sensor EBVS.

In FIG. 9. the activity tracker 312 receives only the filtered events 252 (events within the ROI). Alternatively, the activity tracker 312 can also receive the event packet 250 with all events.

Figure 10A:
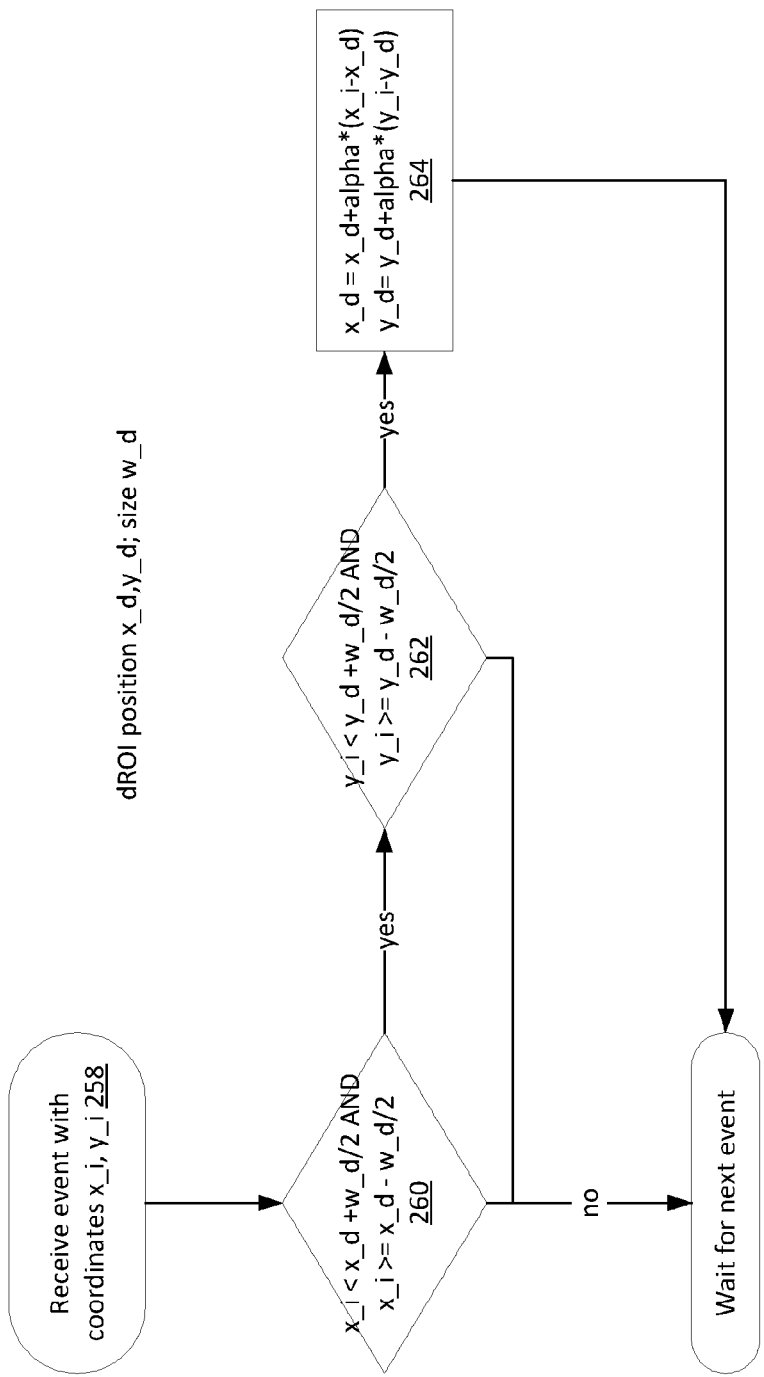
FIG. 10A is a flow diagram showing the operation of the simple activity tracking process.

FIG. 10A is a flow diagram showing the operation of the simple activity tracking process. The process in this flow diagram first checks if an incoming event 258 falls within a dROI in steps 260 and 262. If not, the event is ignored. If yes, the dROI position is updated according to a median tracker algorithm in step 264.

Figure 10B:
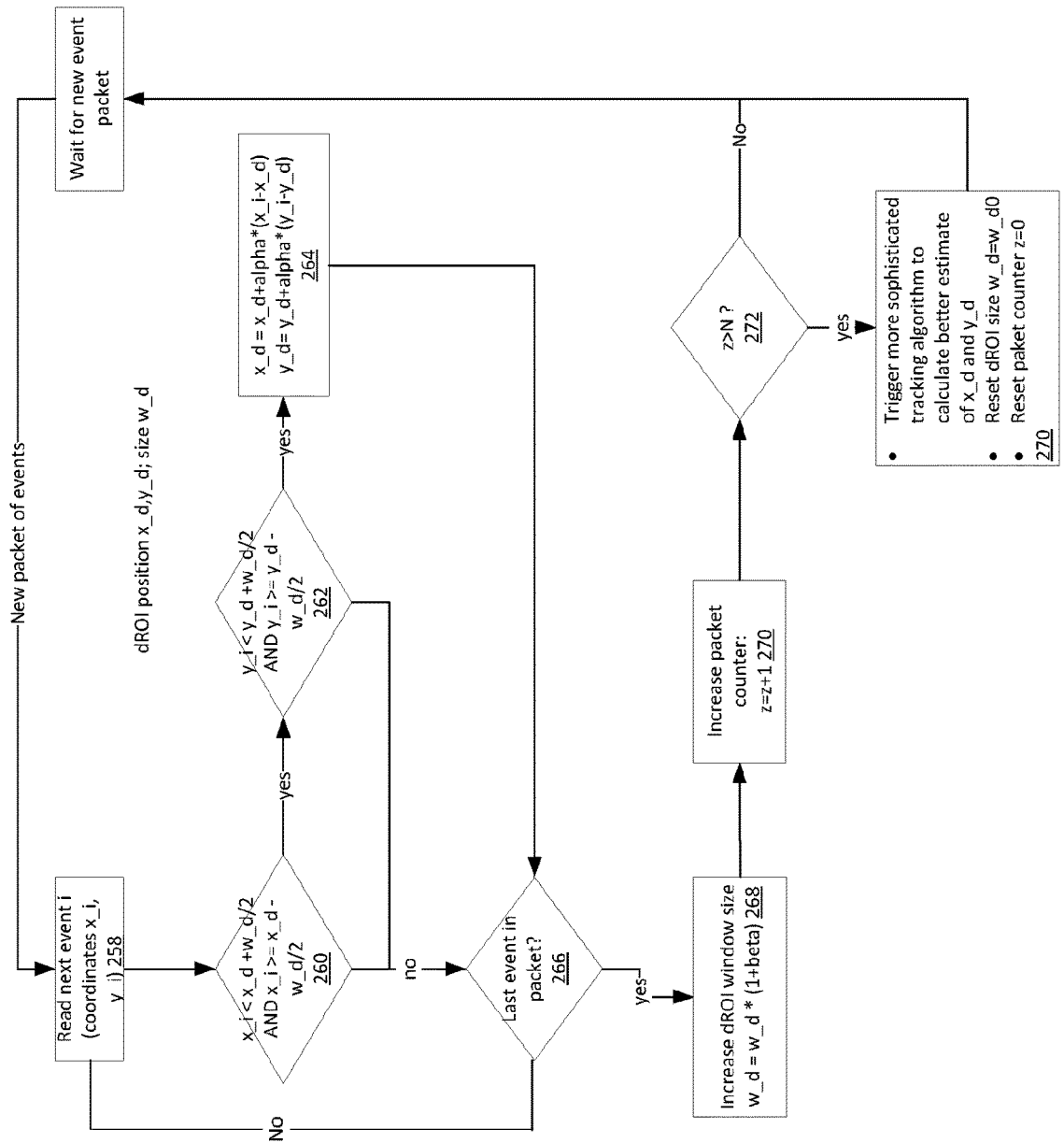
FIG. 10B is a flow diagram showing the operation of another example of the simple activity tracking process.

FIG. 10B is a flow diagram showing the operation of another example of the simple activity tracking process. Events are processed in packets. For each event, it is first checked if it falls within a dROI in steps 260 and 262. If not, the event is ignored and the next packet processed through steps 266 and 258. If yes, the dROI position is updated according to a median tracker algorithm in step 264. After all events from the packet have been processed, the tracking window size is increased in step 268. After a predefined number of event packets is tracked with a counter in step 270 and a decision step 272 based on the counter, a more sophisticated tracking algorithm is triggered, and the tracking window size is reset to a predefined size, and the packet counter is set to zero in step 274.

Figure 11:
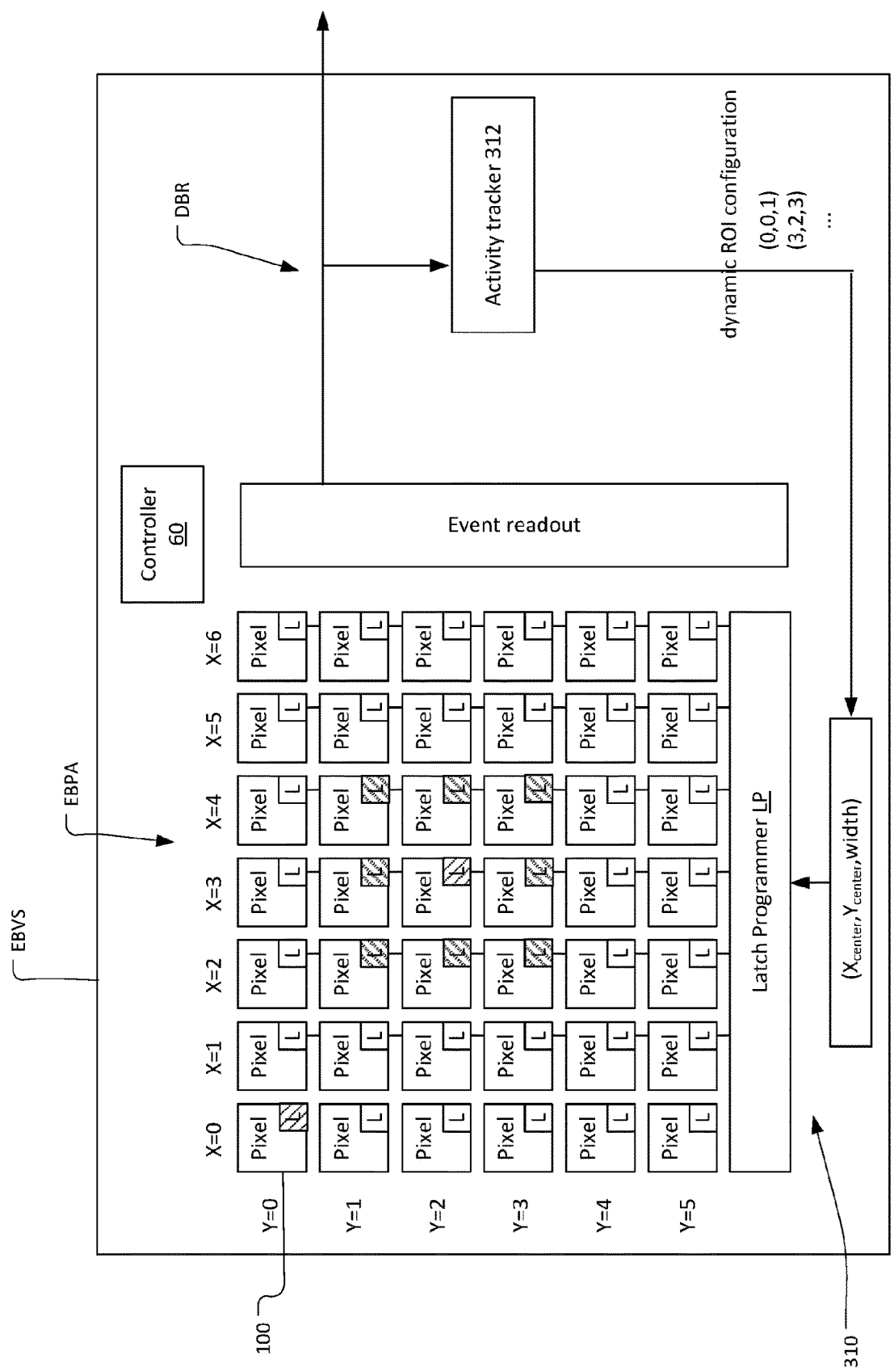
FIG. 11 is a schematic diagram showing the EBPA of the EBVS where each of the pixels 100 include a latch L for enabling and disabling the associated pixel. These latches L are programmed by a latch programmer LP.

FIG. 11 is a schematic diagram showing the EBPA of the EBVS. The event filter 310 of the dynamic ROI processing block DBR implemented by each of the pixels 100 including a latch L for enabling and disabling the associated pixel. These latches L are programmed by a latch programmer LP of the event filter under the control of the of the activity tracker 312.

The strategy is to add a latch L to each pixel 100. The latch L holds an enable/disable bit that is used to prevent "disabled" pixels from communicating events. In this way, the dROI filter 310 is integrated into the hardware of the EBPA. The latches L in the pixels 100 are controlled by the activity tracker, which is controlled/configured/updated by the processing unit PU, in some examples. In this way, the latch programmer LP implements a predictive algorithm to update the dROI position/size.

The advantage of this configuration is that it can avoid power consumption of reading uninteresting events from the array at the downside of slightly increasing pixel size due to the latches and their control.

In this embodiment, the dROI filter can be enabled/disabled (switching can be useful for initialization or to find new ROIs). Moreover, the latch programmer LP can be arbitrarily complex. E.g. it could implement a simple linear extrapolation or a Kalman filter that predicts how ROI moves in order to have optimal ROIs between updates. In this case, window width could also be updated automatically to represent increase in uncertainty.

Embodiment 1 dROI Position Prediction Example

Simple linear dROI prediction (for example implemented in latch programmer):
  t=0 ms→(X0,Y0,w) (ROI update by processing unit PU)
  t=1 ms→(X1,Y1,w) (ROI update by processing unit PU)
  t=1.2  ms→(X1+(X1−X0)*0.2,Y1+(Y1−Y0)*0.2,w+1) (Prediction)
  t=1.4  ms→(X1+(X1−X0)*0.4,Y1+(Y1−Y0)*0.4,w+2) (Prediction)
  t=1.6  ms→(X1+(X1−X0)*0.6,Y1+(Y1−Y0)*0.6,w+3) (Prediction)
  t=1.8  ms→(X1+(X1−X0)*0.8,Y1+(Y1−Y0)*0.8,w+4) (Prediction)
  t=2 ms→(X2,Y2,w) (ROI update by processing unit PU)

Figure 12:
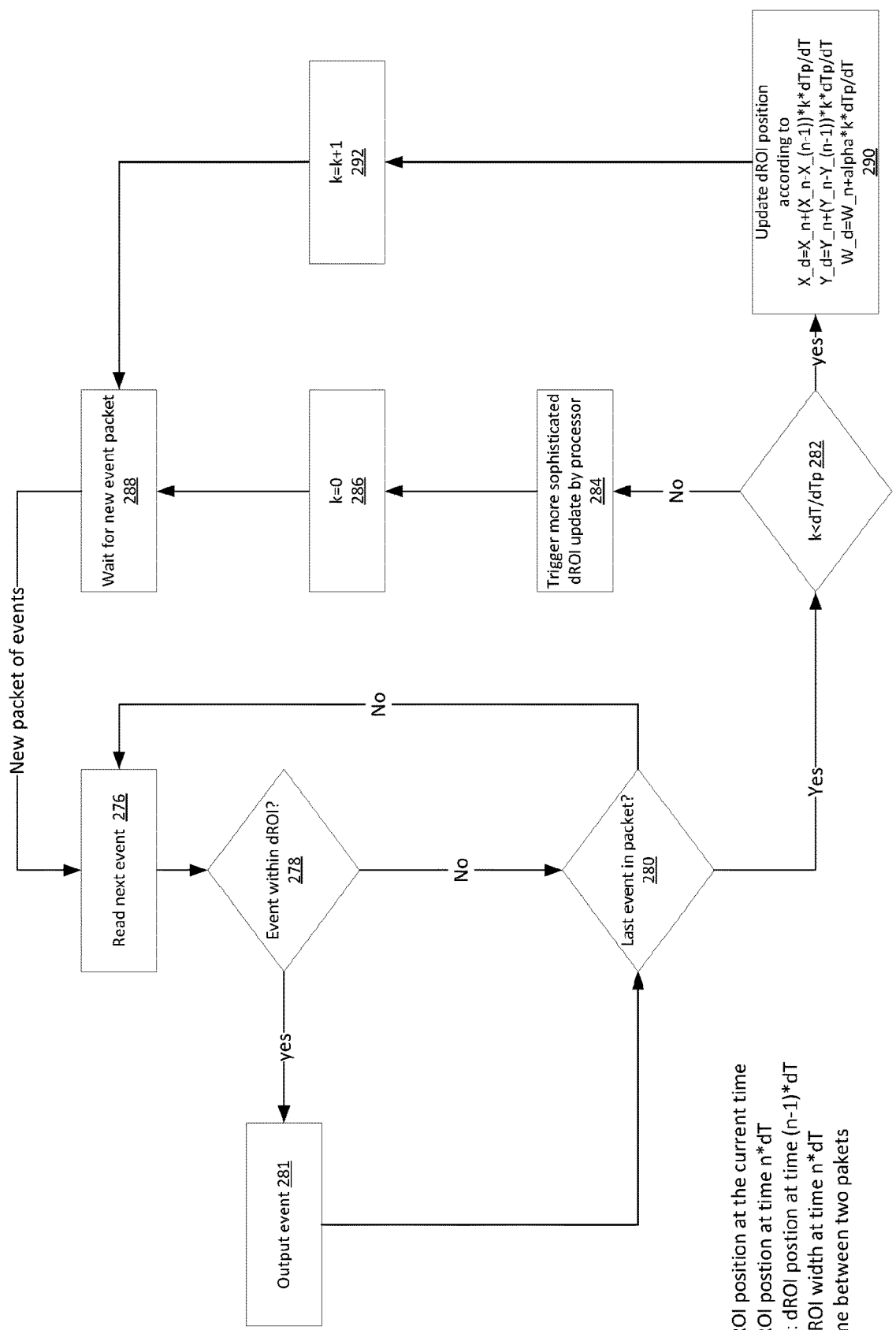
FIG. 12 is a flow diagram showing a process for linear prediction of a dROI region.

FIG. 12 is a flow diagram showing a process for linear prediction. In this example, the simple event tracker 312 is implemented for the event based pixel array. The sophisticated event tracker 314 on the other hand typically executes on the processing unit PU. The process described in the flow diagram processes packets of events in steps 276, 280, 281. First for each event it checks if the event falls within the dROI in step 278. If no, the event is ignored. After processing all events in the packets, the process checks if a predefined time has elapsed in step 282 by reference to a counter k. If yes, a sophisticated tracking algorithm is triggered in step 284 and a counter k is reset in step 286. If no, a linear prediction algorithm is executed in step 290 and the counter k is incremented in step 292. The linear prediction algorithm moves the tracking window linearly in a direction defined by the more sophisticated tracking algorithm.

Figure 13:
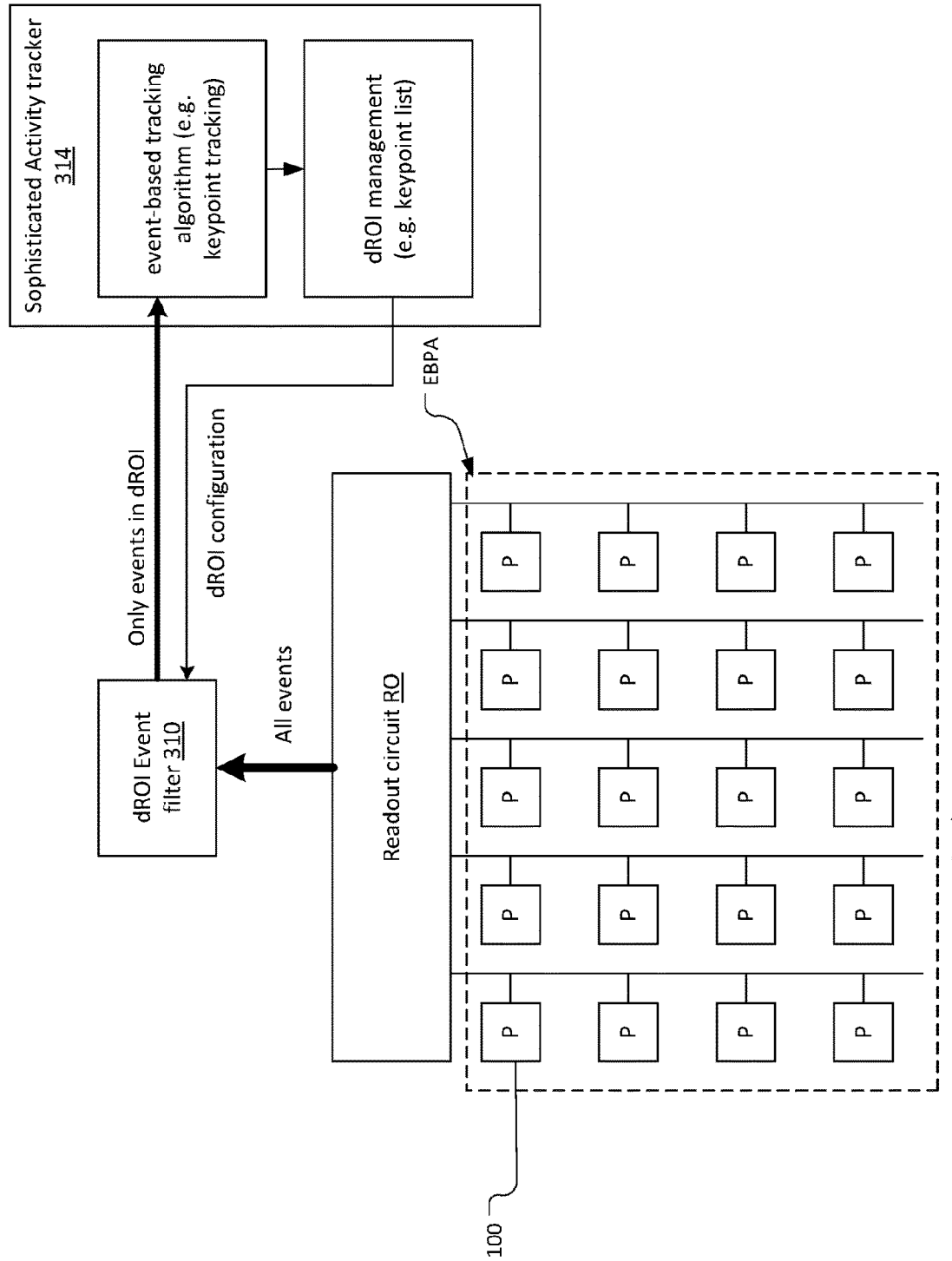
FIG. 13 is a schematic diagram showing a sensor system where the output from the readout circuit is processed by a sophisticated activity tracker and a dROI event filter, which is controlled by the activity tracker. In this embodiment, the sophisticated activity tracker is implemented on the EBVS.

FIG. 13 is a schematic diagram showing the EBPA of the EBVS where the output from the readout circuit is processed by an activity tracker and a dROI event filter 310, which is controlled by the activity tracker 314. In this embodiment, a sophisticated activity tracker is implemented directly on the EBVS.

Figure 14:
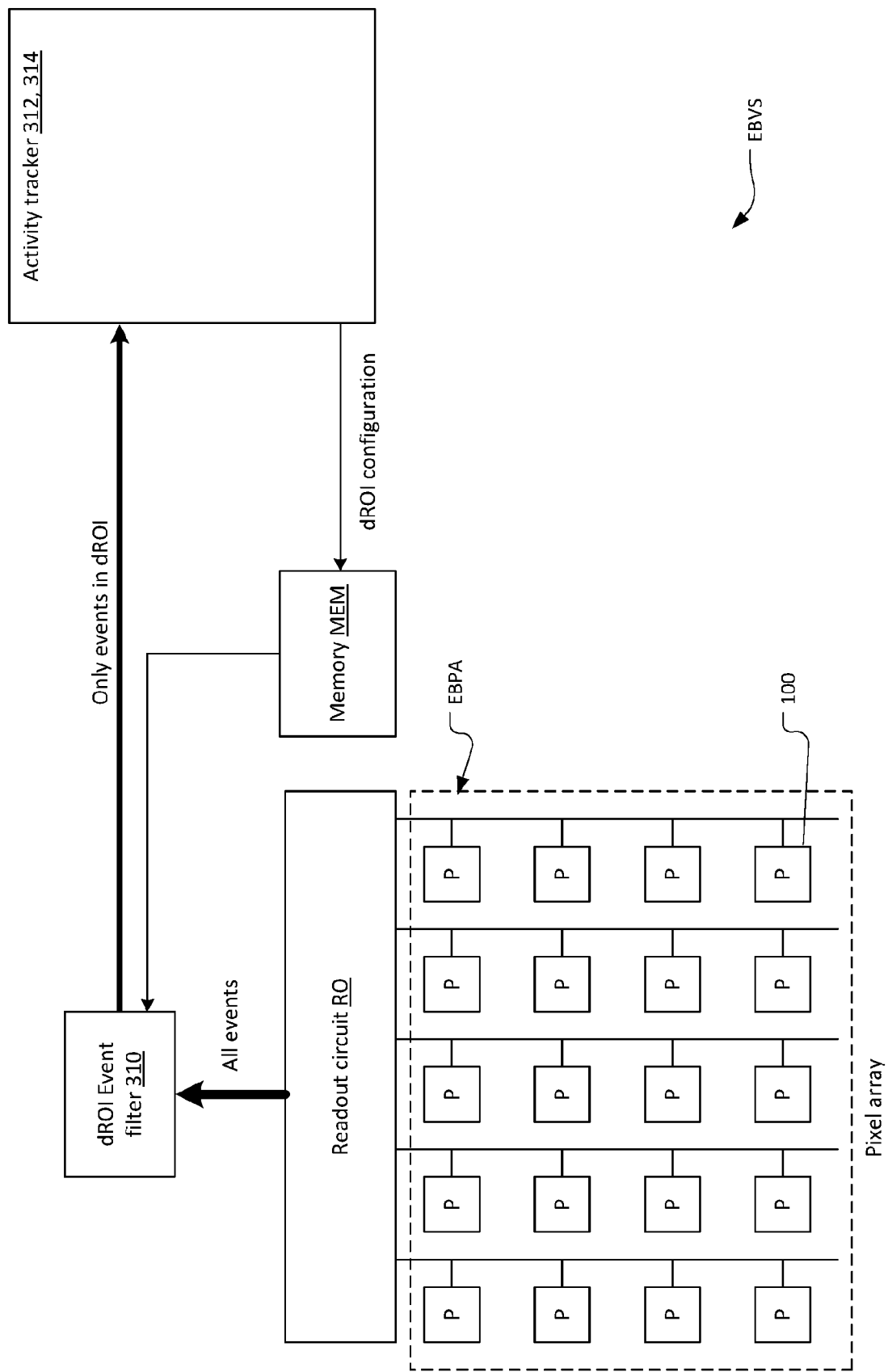
FIG. 14 is a schematic diagram showing a sensor system where the output from the readout circuit is processed by a dROI event filter, which is controlled by the activity tracker.

FIG. 14 is a schematic diagram showing the EBPA of the EBVS where the output from the readout circuit RO is processed by a dROI event filter 310, which is controlled by the one or more activity trackers 312, 314.

This embodiment employs filtering after readout in an explicit event filter function that is stored in a memory MEM. It thus allows for implementing arbitrary shaped dROI's. The activity tracker/dROI management may be part of the sensor or implemented in the separate processor. The memory MEM is preferably implemented on the same chip and possibly even the same die as the event based pixel array EBPA of the event based vision sensor EBVS.

There are two detailed implementations of the memory MEM. In one, each bit in the memory enables/disables one pixel of the pixel array. In the other, the memory contains pixel addresses of pixels that are part of the dROI.

Figure 15:
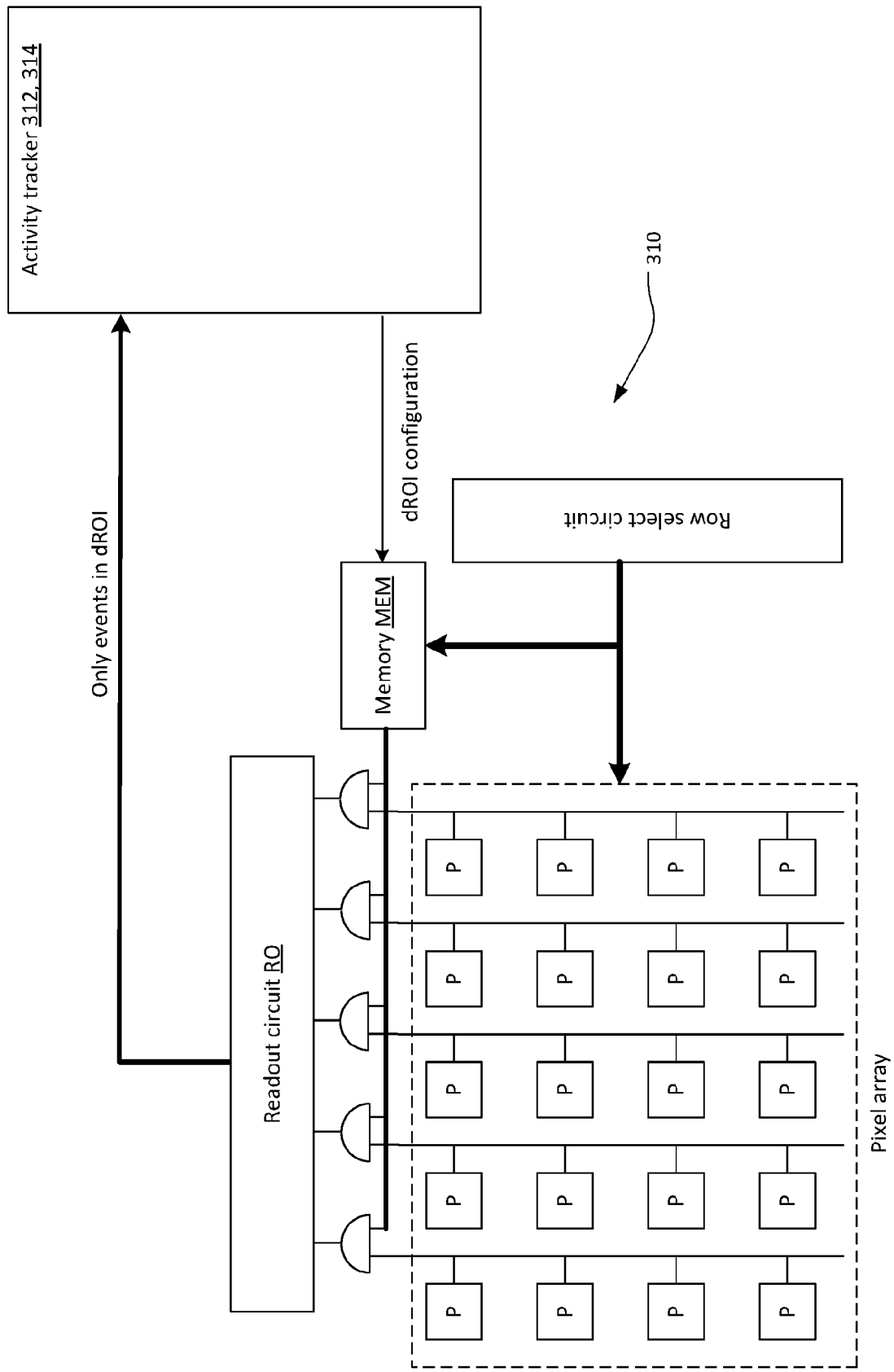
FIG. 15 is a schematic diagram showing a sensor system where the array is selectively read out.

FIG. 15 is a schematic diagram showing the EBPA of the EBVS where the pixels of the EBPA are selectively read out in order to implement the event filter 310.

This embodiment employs filtering in readout. In one example, the event filter 310 is implemented by ANDing the request coming from the pixel with the enable signals coming from the memory MEM, which stores the filter function or shape, before they go into the readout circuit RO. The memory size is equal to size of pixel array (number of bits=number of pixels). This example also allows an arbitrary shaped dROI. Further, the memory may be implemented on same die/device as pixel array. The processor may also be implemented on the same die/device as pixel array.

In a related example, the memory is smaller than array. The filter memory is smaller than a pixel array (for example number of bits=(number of pixels)/4. Then each bit enables/disables readout for multiple pixels.

While this invention has been particularly shown and described with references to preferred embodiments thereof, it will be understood by those skilled in the art that various changes in form and details may be made therein without departing from the scope of the invention encompassed by the appended claims.

What is claimed is:

1. An event based pixel sensor system, comprising:
an event based pixel array including event based pixels that detect change events; and
a dynamic region of interest block that defines one or more regions within the array to isolate change events and may change sizes of the one or more regions based on the change events; wherein a position of the one or more regions is controlled by a combination of a first algorithm that is updated more often than a second algorithm that is run less often and wherein the first algorithm is less complex than the second algorithm.

2. The system as claimed in claim 1, wherein the dynamic region of interest block defines one or more regions of interest from which change events are processed.

3. The system as claimed in claim 1, wherein the dynamic region of interest block defines one or more regions of non interest from which change events are ignored.

4. The system as claimed in claim 1, wherein each of the pixels comprises:
a photoreceptor for detecting light; and
a comparator for comparing an output of the photoreceptor to reference voltage.

5. The system of claim 4, wherein each of the pixels further comprises a capacitor for remembering a past signal from the photoreceptor.

6. The system as claimed in claim 1, wherein each of the pixels resolves ON change events and OFF change events.

7. The system as claimed in claim 1, wherein the dynamic region of interest block filters change events read from the event based pixel array based on the one or more regions.

8. The system as claimed in claim 1, further comprising one or more activity trackers, which are implemented in the dynamic region of interest block and/or a separate processing unit, for updating the one or more regions.

9. The system as claimed in claim 1, wherein the dynamic region of interest block is implemented in the same chip as the event based pixel array.

10. A method for an event based pixel sensor system, comprising:
detecting change events in an event based pixel array; and
defining one or more regions within the array to isolate change events and changing sizes of the one or more regions based on the change events and controlling a position of the one or more regions by a combination of a first algorithm that is updated more often than a second algorithm that is run less often, wherein the first algorithm is less complex than the second algorithm.

11. The method as claimed in claim 10, further comprising: defining one or more regions of interest from which change events are processed and/or defining one or more regions of non interest from which change events are ignored.

12. The method as claimed in claim 10, wherein each pixel of the event based pixel array comprises:
a photoreceptor for detecting light; and
a comparator for comparing an output of the photoreceptor to reference voltage.

13. The method of claim 12, wherein each of the pixels further comprises a capacitor for remembering a past signal from the photoreceptor.

14. The method as claimed in claim 10, wherein the change events include ON change events and OFF change events.

15. The method as claimed in claim 10, further comprising filtering change events read from the event based pixel array based on the one or more regions.

16. The method as claimed in claim 10, further comprising implementing one or more activity trackers in a dynamic region of interest block and/or a separate processing unit, for updating the one or more regions.

17. An event based pixel sensor system, comprising:
an event based pixel array including event based pixels that detect change events; and
a dynamic region of interest block that defines one or more regions within the array to isolate change events, wherein a position of the one or more regions is controlled by a combination of a first algorithm that is updated more often than a second algorithm that is run less often;
wherein the first algorithm is less complex than the second algorithm.

18. An event based pixel sensor system, comprising:
an event based pixel array including event based pixels that detect change events; and
a dynamic region of interest block that defines one or more regions within the array to isolate change events, wherein a position of the one or more regions is controlled by a combination of a first algorithm that is updated more often than a second algorithm that is run less often;
wherein the first algorithm is on the same chip as the event based vision array and the second algorithm is implemented on a separate processor.

* * * * *